United States Patent Office 2,953,563
Patented Sept. 20, 1960

2,953,563

SUBSTITUTED s-TRIAZINE PREPARATION

Frederic C. Schaefer, Darien, and Grace A. Peters, Stamford, Conn., assignors to American Cyanamid Company, New York, N.Y., a corporation of Maine No Drawing. Filed Oct. 18, 1957, Ser. No. 690,895

5 Claims. (Cl. 260—248)

This invention relates to a novel process of preparing trisubstituted s-triazines. More particularly, it relates to an improved process for polymerizing an imidate base in the presence of a Lewis-type acid catalyst to prepare substituted s-triazine in good yield and purity. Still more particularly, the invention is concerned with reaction of imidate bases of the class defined below with corresponding imidate acid salts to obtain valuable substituted s-triazines.

The trimerization of aromatic imidates for purposes of yielding substituted s-triazines has been previously reported. One instance involves detection of s-triazines only after many months and years where an aromatic imidate is stored in a closed container at room temperature. Another suggested technique for synthesizing substituted s-triazines is to react alkyl nitriles in the presence of an alcohol under elevated pressures of at least 1000 atmospheres. However, the use of such elevated pressures is disadvantageous in that special equipment is required. Where an aromatic imidate is converted to a s-triazine, an impractically long time is required. To the present, there appears to be no satisfactory or practical method for preparing trisubstituted s-triazines in good yield from either imidate bases or their acid addition salts. Because substituted s-triazines find utility as vulcanization accelerators, agricultural biocides, dye intermediates, rodenticides, surface active compounds and the like, a practical method for their preparation would be highly desirable.

It is a principal object of the invention to provide a novel, commercially feasible process for preparing trisubstituted s-triazines in good yield and purity. It is a further object of the invention to provide a novel synthesis for converting imidate bases in contact with Lewis-type acids to substituted s-triazines. It is a still further object to provide a process for synthesizing substituted s-triazines from a mixture of imidate bases and their acid addition salts in a reasonable time period and in good yield. Other objects and advantages will become apparent from a consideration of the specific embodiments of the invention as hereinafter described.

These and other objects have been attained in a surprisingly straight-forward manner. It has been found that when a mixture, comprising an imidate base and the corresponding acid addition salt as prepared from the imidate base and a Lewis-type acid, is formed, that mixture can advantageously be trimerized in the liquid phase under substantially anyhydrous conditions to obtain hitherto unavailable yields of substituted s-triazines. It has also been found that imidate vapors may be passed over a heated solid Lewis-type acid catalyst to cause swift trimerization of the imidate to an s-triazine in good yield. In this manner, trimerization advantageously occurs within 60 seconds in the vapor phase, and not more than thirty days where carried out in the liquid phase.

In general, a wide variety of imidate bases can be used in the process of the present invention. Such bases conform to the general structure:

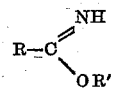

where R is an aliphatic or aryl group and R' is a lower alkyl or phenyl substituent. Illustrative of the aliphatic group corresponding to "R" is included: methyl, ethyl, propyl, butyl, hexyl, octyl, lauryl, stearyl, 4-cyanobutyl, trichlormethyl, α-bromoethyl, methoxymethyl, propoxymethoxyethyl, allyl and isomers thereof. As the aryl group: phenyl, naphthyl, nitrophenyl, chlorophenyl, cyanonaphthyl, or 3-anthraquinoyl is included. The "R'" group can be illustrated by and contemplates: phenyl and lower alkyl radicals, such as methyl, ethyl, n-propyl, isopropyl, n-butyl and isobutyl. The imidates contemplated are readily prepared by reacting an appropriate organic nitrile with an alcohol according to methods known for imidate preparation.

The mixture employed in the trimerization operation may be variously prepared. For instance, the above-defined imidates can be reacted with a variety of Lewis-type acids. Such substances include weak and strong inorganic and organic acids, as well as substances capable of coordinating or complexing with a base. As exemplary of strong acids characterized as having a $K_a$ value greater than about $10^{-2}$ are included: hydrogen chloride, sulfuric, phosphoric, nitric, oxalic, chlorosulfonic acid and trifluoroacetic acid. Illustrative of the weak acids which are characterized as having a $K_a$ value less than $10^{-2}$ are: acetic acid, lactic, citric, tartaric, benzoic, toluic and the like. As Lewis-type acid substances capable of coordinating or complexing with imidate bases to form a salt include, for example: carbon dioxide, aluminum chloride, boron trifluoride, silica gel and silica-alumina gel. The Lewis-type acids should be employed in the anhydrous state. However, small amounts of water as water of crystallization may be tolerated. The presence of water in excess of about 25 mole percent based on the imidate is usually deterimental to s-triazine recovery in that it causes excessive hydrolysis of the imidate.

In reactions which involve the preparation of a mixture suitable for trimerization, a quantity less than 100 mole percent of a strong acid of $K_a$ value greater than about $10^{-2}$ should be added to the imidate base. In general, a good practice is to introduce such strong acids in amounts equal to from about 1 to about 25 mole percent, and preferably from 2 to 15 mole percent, based on the imidate base. Where more than 25 mole percent is used, such addition is not found to be advantageous because the overall yield of resultant substituted s-triazine is progressively and substantially reduced as the strong acid added to the imidate base approaches 100 mole percent. With the addition of 100 mole percent or higher, the imidate base is converted almost completely to the imidate acid addition salt. The latter salt cannot be trimerized to a substituted s-triazine.

In the formation of a mixture of imidate base and imidate acid salt prepared by adding a weak acid of $K_a$ value less than about $10^{-2}$ to the imidate base, a wider range of weak acid quantities may be used as compared to strong acid additions. It has been found that from 1 mole percent to as much as 300 mole percent or more may advantageously be employed. Even where quantities in excess of 100 mole percent of weak acid are added, trimerization is observed since there is present sufficient free base and salt in admixture due to the fact that the base is in equilibrium with the corresponding formed imidate acid addition salt. As a good operating range, of from 5 to 30 mole percent of the weak acid is preferred to effect reaction.

A second alternative for preparing a mixture suitable for trimerization is to admix an imidate base as defined above and an imidate acid addition salt. The respective amounts of base and salt in the resultant mixture widely various, since they depend upon the basicity of the imidate base. In general, the higher the ratio of salt to base, the lower the yield of resultant substituted s-triazines.

A third alternative for effecting imidate mixture formation is to cause an imidate strong acid addition salt to react with an alkaline salt of a weak acid in an anhydrous medium to permit a metathesis to occur. In this manner, the weaker acid replaces the stronger acid of the imidate salt and the strong acid is precipitated in the form of the alkali salt. It is then readily removed by filtration and the resultant mixture trimerized. In general, the alkali metal salts of weak acids such as acetic acid, propionic acid, butyric acid, isomers and equivalents thereof may be used in this alternative procedure. As alkali metals, sodium, potassium, lithium and the like are included as illustrative.

In each of the methods described above for obtaining a suitable mixture prior to trimerization, a wide variety of solvents may be used. These are, for example, ethanol, isopropanol, glacial acetic acid, dioxane, acetonitrile, methyl ethyl ketone and the like. Since it is preferred to maintain the reaction as concentrated as possible to avoid side reactions, the use of solvents should, where possible, be avoided since decreased yields of desired substituted s-triazine product may result.

Still another procedure for effecting trimerization is to cause imidate vapors to pass over a Lewis-type solid acid catalyst, such as silica gel or silica-alumina gel, at temperatures above 100° C., and preferably from 150° C. to 200° C., for from about 1 to 60 seconds. In this procedure, it is thought that in-situ formation of a mixture of imidate base and complex imidate salt takes place. As such, the mixture is capable of undergoing rapid trimerization to yield substituted s-triazines.

It is an advantage of the process that reaction may occur at room temperature and higher. However, temperatures as high as 200° C. can be resorted to a previously stated, particularly where both the solid acid catalyst and the imidate are both preheated prior to contact and resultant trimerization.

Without being limited to any theory of reaction in the process of the present invention, it is believed that three competing reactions may occur simultaneously. For instance, in a system containing an alkyl imidate base and the corresponding acid addition salt, the reaction can involve the decomposition of the imidate addition salt in the mixture to the alkyl ester and the corresponding amide. A second reaction can involve the preparation of an organic cyanide and an alcohol. And a third reaction hitherto unknown can involve the formation of substituted s-triazone by trimerization. Unexpectedly, by proceeding in accordance with the process of the present invention, the third reaction overshadows the other reactions, so that substantially increased yields of substituted s-triazines are now realized.

To further elucidate the process of the invention, the following examples are presented as illustrative embodiments which are not to be taken as limitative. Where parts are given, they are intended to mean parts by weight.

EXAMPLE 1

A mixture comprising ethyl acetimidate (0.26 mole) and acetic acid (0.017 mole) was charged to a suitable vessel equipped with distillation column. Reaction occurred exothermically. After six hours, the mixture was distilled and 2,4,6-trimethyl-s-triazine, boiling at 148° C.–150° C., was recovered in 90% yield.

When ethyl acetimidate alone was heated at 80° C.–90° C. for six hours as above, no detectable quantity of the corresponding substituted s-triazine was observed.

EXAMPLE 2

To a suitable vessel equipped with distillation column is charged an equimolar mixture of ethyl acetimidate and acetic acid and held for two hours at about room temperature. Subsequent distillation gave an essentially quantitative yield of 2,4,6-trimethyl-s-triazine.

EXAMPLE 3

To a mixture of 0.05 mole of ethyl acetimidate hydrochloride and 5 cc. of absolute ethanol was added 0.05 mole of anhydrous sodium acetate. After a mildly exothermic initial reaction, the mixture was allowed to stand for three hours at room temperature. Precipitated sodium chloride was then filtered and resultant solution was then distilled. 2,4,6-trimethyl-s-triazine was recovered in almost quantitative yield.

EXAMPLE 4

4 mole percent of ethyl acetimidate hydrochloride was added to 1 mole of ethyl acetimidate in a suitable vessel. The mixture was held at 25° C. for five days. At the end of that time, infrared examination showed that conversion to 2,4,6-trimethyl-s-triazine was substantially complete.

EXAMPLE 5

Ethyl acetimidate (0.047 mole) was treated with each of the following acidic materials (10 mole percent based on the acetimidate) in separate runs and stored in closed containers at room temperature. After 20 to 24 hours, the reaction mixtures were filtered and the filtrates were analyzed by infrared with the results as shown in the table:

Table

| Catalyst: | Conversion to 2,4,6-trimethyl-s-triazine |
|---|---|
| Oxalic acid dihydrate | Substantially complete. |
| Tartaric acid | Complete. |
| Benzoic acid | Do. |
| Formic acid | Do. |
| $BF_3 \cdot (C_2H_5)_2O$ | Do. |

EXAMPLE 6

Ethyl acetimidate (.03 mole) was saturated with dry carbon dioxide to form a complex salt of the imidate base. The mixture was held at 25° C. After fifteen days, conversion to 2,4,6-trimethyl-s-triazine was obtained in amounts greater than 60%. Holding the mixture for an additional eight days, distillation gave a 71% yield of 2,4,6-trimethyl-s-triazine. In the absence of carbon dioxide, no reaction was detected for more than eight months.

EXAMPLE 7

A mixture of ethyl acetimidate (0.1 mole), triethylamine hydrochloride (0.02 mole) and 5 cc. of absolute ethanol was allowed to stand at 25° C. for twenty hours. It was then filtered and the filtrate was distilled. 2,4,6-trimethyl-s-triazine was obtained in 60% yield and a small amount of unchanged imidate was recovered.

EXAMPLE 8

A mixture of ethyl benzimidate and 28 mole percent acetic acid, based on the imidate, was heated for eighteen hours at about 80° C. The insoluble material which crystallized from the reaction mixture was filtered and washed with water. The solid obtained was 2,4,6-triphenyl-s-triazine, M.P. 235° C.–237° C.; the yield was 36%.

EXAMPLE 9

Methyl benzimidate (0.097 mole) was treated with 10 mole percent of acetic acid and the mixture was stored at room temperature for four days. The mixture was then filtered and the crystals of 2,4,6-triphenyl-s-triazine were washed with water. The yield was 48%. After another five days at room temperature, the reaction mixture yielded another 14% of 2,4,6-triphenyl-s-triazine.

The effect of omitting acetic acid from the procedure of Example 9 is shown in the following example.

EXAMPLE 10

Crude methyl benzimidate (92% pure) as prepared by the addition of the imidate hydrochloride to concentrated aqueous potassium carbonate, followed by extracting the free base with ether and then evaporating the ether solution and drying, was stored at room temperature in a closed bottle for eight months. No crystals separated during this time and no change in the solution was detectable by infrared examination.

In a separate run, distilled methyl benzimidate (99+% pure) was found to be equally stable as the crude benzimidate was when stored for an equal length of time.

EXAMPLE 11

Reaction of a mixture of 2 moles of methyl benzimidate and 1 mole of acetic acid for 48 hours at room temperature gave a 79% yield of 2,4,6-triphenyl-s-triazine.

EXAMPLE 12

Methyl benzimidate hydrochloride (.10 mole) in 10 cc. of methanol was treated with .10 mole of anhydrous sodium acetate. The yield of 2,4,6-triphenyl-s-triazine was 24% after one day at 25° C., and 42% after three days.

EXAMPLE 13

Ethyl propionimidate (72% pure) was treated with 9 mole percent of acetic acid and stored for 24 hours at room temperature. Distillation then gave a 74% yield of 2,4,6-triethyl-s-triazine having a boiling point of 128° C.–130° C. at 30 mm. Hg.

EXAMPLE 14

Ethyl laurimidate hydrochloride (.040 mole) and anhydrous sodium acetate (0.040 mole) were mixed in 5 cc. of absolute ethanol and the mixture was held at 25° C. for twenty hours. It was then diluted with water and extracted with ether. The ether solution was dried and evaporated. Distillation of the residue gave a forerun of ethyl laurate followed by 2,4,6-triundecyl-s-triazine, B.P. approximately 260° C. at 3 mm. Hg. Yield about 30%.

EXAMPLE 15

Reaction of methyl 5-cyanovalerimidate hydrochloride and an equimolar amount of anhydrous sodium acetate in methanol at 65° C. for one and one half hours followed by workup as described in Example 14 gave 2,4,6-tris(4-cyanobutyl)-s-triazine (M.P. 72° C.–73° C.) in good yield.

EXAMPLE 16

Acetic acid (12 mole percent) was added to ethyl α-phenylacetimidate and the mixture was held for 16 hours at 25° C. Infrared examination at intervals indicated that the reaction was substantially over after one and one half hours. The reaction mixture was drowned in water and the crude product was extracted with ether. Evaporation of the extract and distillation of the residue gave 2,4,6-tribenzyl-s-triazine, B.P. 238° C.–239° C. at 2 mm. Hg. The yield was approximately 50% and some ethyl phenylacetate was recovered.

EXAMPLE 17

A mixture of ethyl chloroacetimidate hydrochloride (0.50 mole) and anhydrous sodium acetate (0.50 mole) were mixed in 50 cc. of absolute ethanol and the mixture was allowed to stand for twenty hours at room temperature. It was then diluted with water and after two hours the crystallized product was filtered. Washing with water and with methanol gave crude 2,4,6-trischloromethyl-s-triazine, M.P. 73° C.–74° C. Crude yield amounted to 68.5%. The product was recrystallized from methanol, giving a material melting at 77° C.–79° C.

EXAMPLE 18

The procedure of Example 17 was repeated in every detail except ethyl α-chloropropionimidate was substituted for the chloroacetimidate. The resultant reaction mixture was converted to 2,4,6-tris(α-chloroethyl)-s-triazine of B.P. 118° C.–123° C. at 0.8 mm. Hg.

EXAMPLE 19

A mixture comprising methyl trichloroacetimidate (0.012 mole) and acetic acid (0.003 mole) was heated for 6.5 hours at about 80° C. Infrared examination showed that the imidate was nearly completely converted and that little or no trichloroacetamide was produced. A good yield of 2,4,6-tris(trichloromethyl)-s-triazine was obtained.

EXAMPLE 20

A mixture of methyl anisimidate (0.040 mole) and acetic acid (0.020 mole) was heated for two hours at 70° C.–90° C. 2,4,6-tris(p-methoxyphenyl)-s-triazine crystallized as the reaction proceeded. The product was filtered and washed with methanol, M.P. 214° C.–216° C. Yield 68%.

EXAMPLE 21

Addition of 25 mole percent of acetic acid to methyl anisimidate in absolute ethanol followed by 72 hours reaction time at 25° C. gave a 38% yield of 2,4,6-tris(p-methoxyphenyl)-s-triazine.

EXAMPLE 22

A mixture of methyl p-chlorobenzimidate hydrochloride and an equimolar amount of anhydrous sodium acetate in methanol was held for 24 hours at room temperature. 2,4,6-tris(p-chlorophenyl)-s-triazine crystallized and was recovered by filtration. After washing with hot ethanol it had M.P. 340° C.–342° C.

EXAMPLE 23

A mixture of ethyl p-nitrobenzimidate (0.0434 mole) and acetic acid (0.048 mole) was heated at 70° C.–80° C. for two hours. Water was then added and the insoluble product 2,4,6-tris(p-nitrophenyl)-s-triazine was filtered and washed with methanol. It had a melting point above 360° C. and the yield obtained is approximately 51%.

EXAMPLE 24

Methyl m-nitrobenzimidate was prepared by reaction of 0.15 mole of m-nitrobenzonitrile with 50 cc. of methanol in the presence of 0.01 mole of sodium methoxide for 2.5 hours at 25° C. This gave an approximately 70%–75% yield of the imidate in solution. To this solution was added 0.17 mole of glacial acetic acid. The solvent methanol was evaporated and the residue was heated at 70° C.–90° C. for two and one-half hours. The cake obtained was extracted with hot water and with methanol. The undissolved material was 2,4,6-tris-m-nitrophenyl-s-triazine, M.P. 348° C.–350° C. m-Nitrobenzonitrile was recovered from the washings and amounted to 40% of the starting material. The yield of the triazine compound was 79% based on the unrecovered nitrile.

EXAMPLE 25

A mixture of ethyl m-nitrobenzimidate (0.051 mole) and acetic acid (0.064 mole) was heated for four hours at 70° C.–80° C. The product 2,4,6-tris-m-nitrophenyl-s-triazine was filtered and washed with ether and with water, M.P. 347° C. Yield 68%.

EXAMPLE 26

A mixture of 27.0 parts of 89.6% isopropyl acetimidate (0.278 mole) and 1 cc. of acetic acid (6 mole percent) was allowed to react exothermically. After 2.5 hours, titration indicated the trimerization was 91% complete, Distillation of the mixture after four hours separated the by-product isopropanol, B.P. 82° C., from 2,4,6-trimethyl-s-triazine, B.P. 153° C. The weight of trimethyl triazine thus obtained was 9.2 parts, equivalent to a yield of 80.6%.

EXAMPLE 27

A mixture of 11.7 parts (0.09 mole) of methyl isopropoxyacetimidate and 0.5 part of acetic acid (approximately 10 mole percent) is allowed to stand for a week at room temperature. It is then treated with 20 cc. of water, and extracted with 25 cc. of ether. The ether layer is washed with water until the wash water is neutral, dried over Drierite, and stripped to obtain 6.7 parts (75%) of crude product as the residue. Distillation of the crude product gives 5.1 parts of 2,4,6-tris(isopropoxymethyl)-s-triazine, B.P. 153° C.–156° C. at 1.5 mm. Hg with the following analysis:

Calculated for $N_3O_3C_{15}H_{27}$: C, 60.58%; H, 9.15%, N, 14.12%. Found: C, 60.55%; H, 9.31%; N, 14.41%.

The yield of pure product was 57%.

EXAMPLE 28

α-(Propoxymethoxy) propionitrile was prepared from dipropyl formal and lactonitrile in the general manner described by Loder and Bruner (United States Patent No. 2,398,757), B.P. 71° C. at 7 mm. Hg. The nitrile was then converted to the methyl imidate by reaction with excess methanol in the presence of sodium methoxide. The equilibrium mixture of imidate, nitrile and methanol obtained was neutralized by treatment with excess carbon dioxide. The treated mixture was filtered, and the reaction product was distilled. The nitrile and imidate boiled together at about 68° C. at 4 mm. Hg giving a mixture containing 75% of methyl α-(propoxymethoxy)-propionimidate. This mixture (210 parts) was treated with 16 parts of glacial acetic acid. After three days, the mixture fractionally distilled and 76 parts (equivalent to a 59% yield) of 2,4,6-tris(α-propoxymethoxyethyl)-s-triazine was obtained, B.P. 192° C.–194° C. at 3 mm. Hg.

The latter compound possesses surface activity in that it lowers the surface tension of acetone and methyl Cellosolve.

EXAMPLE 29

Ethyl acetimidate was added from a reservoir to the top of a steam heated glass coil which acted as a vaporizer. The vapor then passed into the upper end of a vertical one inch Pyrex tube which was packed with silica alumina for a height of 15 cm. and was heated electrically to a temperature of 150° C.–160° C. The vapor passed through this catalyst bed at such a rate that the contact time was 10 seconds. Exit vapors were condensed in an ice-cooled receiver. Fractional distillation of the material collected showed that the conversion of imidate to 2,4,6-trimethyl-s-triazine was approximately 25%.

We claim:
1. In an improved process for preparing trisubstituted s-triazines in good yield and purity the steps which comprise: bringing together an imidate base of the structure

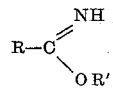

and the corresponding Lewis-type acid addition salt thereof at a temperature within the range of from about 20° C. to about 200° C., and recovering the thus-formed trisubstituted s-triazine, R in the above formula being selected from the class consisting of substituted and unsubstituted saturated alkyl having from 1 to 18 carbon atoms, allyl, and substituted and unsubstituted aryl, said substituents being selected from the class consisting of cyano-, nitro-, halo-, lower alkoxy- and phenyl, and R' being selected from the class consisting of a lower alkyl and phenyl.

2. The process according to claim 1 in which the imidate is ethyl acetimidate.

3. The process according to claim 1 in which the imidate base and the corresponding Lewis-type acid addition salt are brought together in a substantially anhydrous solvent medium.

4. In a process for preparing trisubstituted s-triazines in good yield and purity the steps which comprise: vaporizing an imidate base of the structure

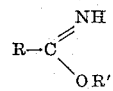

passing said vapor over silica alumina gel at a temperature of from about 150° C. to about 200° C. for from about 1 to 60 seconds, withdrawing the so-reacted vapors, condensing said vapors and recovering resultant trisubstituted s-triazines, R in the above formula being selected from the class consisting of substituted and unsubstituted saturated alkyl having from 1 to 18 carbon atoms, allyl, and substituted and unsubstituted aryl, said substituents being selected from the class consisting of cyano-, nitro-, halo-, lower alkoxy- and phenyl, and R' being selected from the class consisting of a lower alkyl and phenyl.

5. The process according to claim 4 in which the imidate base is ethyl acetimidate.

References Cited in the file of this patent

UNITED STATES PATENTS

| | | |
|---|---|---|
| 1,989,042 | Kunz et al. | Jan. 22, 1935 |
| 2,682,541 | Kaiser | June 29, 1954 |

OTHER REFERENCES

Johnson et al.: Journal of the American Chemical Society, vol. 44, pp. 1341–1343 (1922).

Scholl: Berichte Deut. Chem. Gesell., vol. 33, pp. 1054–1055 (1900).